United States Patent
Levin et al.

(10) Patent No.: US 12,440,055 B1
(45) Date of Patent: Oct. 14, 2025

(54) COOKING BOX FUNCTIONING WITH AN EXTERNAL SOURCE OF HOT AIR

(71) Applicants: Alexander Levin, Binyamina (IL); Hanan-Emanuel Levin, Binyamina (IL)

(72) Inventors: Alexander Levin, Binyamina (IL); Hanan-Emanuel Levin, Binyamina (IL)

( * ) Notice: Subject to any disclaimer, the term of this patent is extended or adjusted under 35 U.S.C. 154(b) by 0 days.

(21) Appl. No.: 18/796,281

(22) Filed: Aug. 6, 2024

(51) Int. Cl.
*F24S 20/30* (2018.01)
*A47J 27/00* (2006.01)
*A47J 37/06* (2006.01)
*A47J 45/06* (2006.01)

(52) U.S. Cl.
CPC ......... *A47J 27/002* (2013.01); *A47J 37/0641* (2013.01); *A47J 45/06* (2013.01); *F24S 20/30* (2018.05)

(58) Field of Classification Search
USPC ........................................................ 126/681
See application file for complete search history.

(56) References Cited

U.S. PATENT DOCUMENTS

| | | | | |
|---|---|---|---|---|
| 117,476 A | * | 7/1871 | Sperry ................. | F24S 10/90 126/681 |
| 3,796,174 A | * | 3/1974 | Wilson ................. | B23P 11/00 493/93 |
| 4,193,389 A | * | 3/1980 | Ku ...................... | F24S 20/20 126/714 |
| 5,233,969 A | * | 8/1993 | Koledin ............... | A47J 33/00 126/261 |
| 2009/0133688 A1 | | 5/2009 | La | |

FOREIGN PATENT DOCUMENTS

| | | | |
|---|---|---|---|
| CN | 102944071 A | * 2/2013 | |
| CN | 202902644 U | * 4/2013 | |
| GB | 2484353 A | 12/2010 | |
| WO | WO2004042290 A1 | 5/2004 | |
| WO | WO-2019102251 A1 | * 5/2019 | .............. F24S 23/74 |

OTHER PUBLICATIONS

Navendu Misra et al., "Box-Type Solar Cookers: An Overview of Technological Advancement, Energy, Enviromental, and Economic Benefits", Journal, Feb. 2023, Energies Journal https://www.mdpi.com/1996-1073/16/4/1697.

* cited by examiner

*Primary Examiner* — Jorge A Pereiro

(57) ABSTRACT

A cooking box functions by the supply of an external source of hot air with a temperature higher than 100° C. This external source of hot air is preferably a solar thermal collector of a flat-plate type or CSP (concentrating solar power) type. Auxiliary details in the cooking box allow to achieve high heat transfer parameters from the hot air to cooking utensils placed in the cooking box. The cooking box can comprise a PCM heat storage system for the application of stored heat for cooking or heating food, when the external hot air is not supplied.

16 Claims, 16 Drawing Sheets

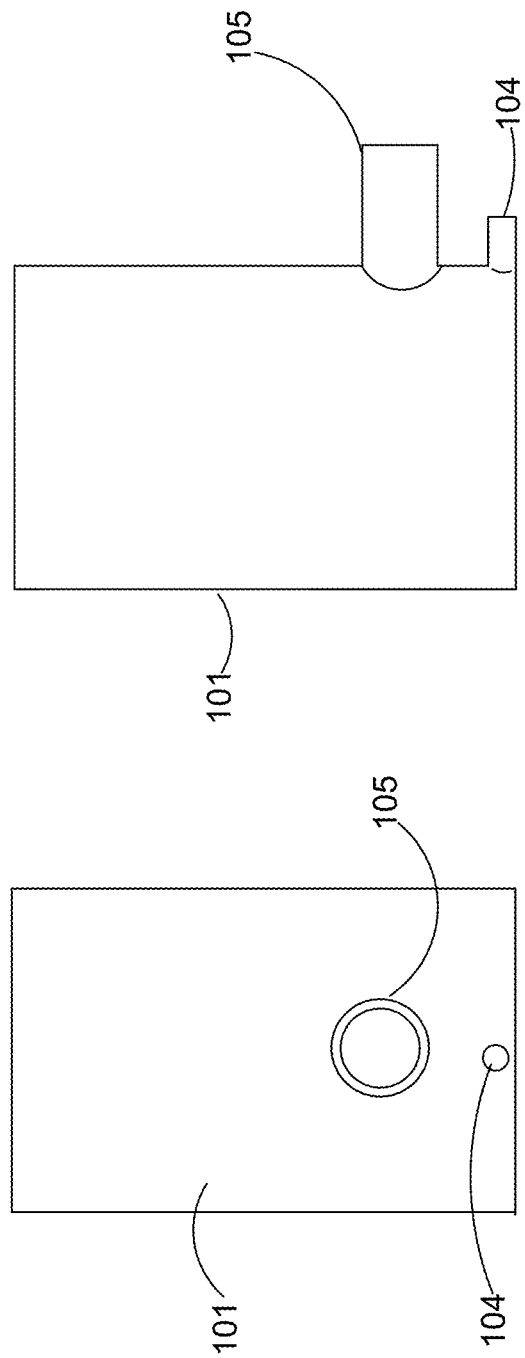

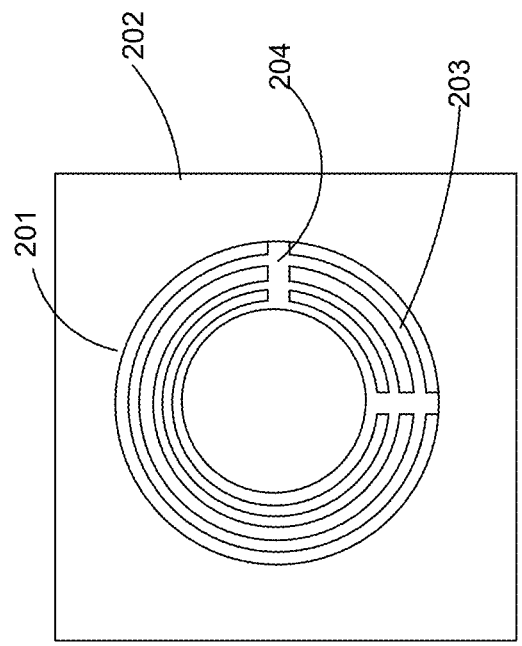
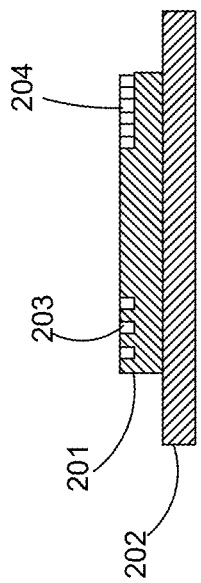
Fig. 2B
Fig. 2A

COOKING BOX FUNCTIONING WITH AN EXTERNAL SOURCE OF HOT AIR

BACKGROUND OF THE INVENTION

More than a quarter of the world's population relies on dung, wood, crop waste, or coal to meet their basic energy needs. However, according to the United Nations, about one-third of the world-two billion people-now suffer fuelwood shortages, which means it is harder to find and more expensive. Women, and sometimes children, must walk further distances to find fuel for the family. Some urban families spend 30-50% of their income on cooking fuel or must barter away food for fuel to cook the remainder.

As a result, families drop the nutritious foods that require lengthy cooking—such as vegetables—from their diet, contributing to malnutrition.

Solar cookers prevent deforestation.

Cooking is the main source of demand for wood fuel and can be a major cause of deforestation.

Deforestation contributes to climate change, floods, and soil erosion, increasing environmental degradation, and increasing poverty and hunger.

Each solar cooker in sunny, arid climates can save one ton of wood annually. Meanwhile, with solar cookers families often reduce fuel wood needs by half.

Solar cookers prevent pollution.

Burning fuels such as wood and gas pollute the air and contribute to climate change. Solar cookers provide a pollution-free alternative.

Cooking and heating on open fires or stoves without chimneys leads to indoor air pollution. Every year, indoor air pollution is responsible for the death of 1.6 million people.

Patent EAP 022804 describes a solar heat collector filled with heat storage and conducting material that transfers the solar heat to a heat-insulated range through a heat-transferring medium for cooking foods in utensils and heating water.

However, this patent describes a very complicated cooking system with the application of heat pipes for transferring heat from the solar collector section to the cooping section.

Patent GB 2484353 describes a solar oven for cooking purposes comprised an oven body covered in reflective material, a cooking surface, a lid, a heat storage unit, and a circulatory fan, where the lid is shaped with a mixture of concave and convex portions. Preferably, the heat storage unit comprises a chamber filled with an ionic liquid or a chamber filled with a gaseous or liquid hydrocarbon. Alternatively, the heat storage unit may comprise a solid heat-absorbent material. The heat storage unit may form the surface upon which cooking takes place. Preferably, the temperature within the oven is homogenized by the use of the circulatory fan. The oven may be tiltable upon its base to be positioned in optimum sunlight depending on the position of the sun and the terrain in which the oven is placed. Furthermore, the lid may also be tiltable upon the oven to be positioned in optimum sunlight. Preferably, the cooking surface is either part of the reflective surface or comprises a raised grill situated above the base of the oven.

SUMMARY OF THE INVENTION

This invention proposes a novel design for a solar cooker: a combination of an external source supplying hot air into a cooking box, which plays the role of an oven. The cooking box comprises an external housing, thermal insulation of its lateral walls, a bottom, and an internal housing. A lid with thermal insulation closes this cooking box; the lid is provided with opening appliances, for example with handles on its upper surface.

A flat pedestal is established via a basis plate on the bottom of the internal housing. This flat pedestal comprises several concentric grooves intended for setting removable metal cylinders, which, in turn, serve for setting pots of different diameters. The internal diameter of each removable metal cylinder is larger than the outer diameter of its corresponding pot; in such a way, there is a gap between the pot's outer wall and the internal wall of the removable metal cylinder.

The lower section of each removable metal cylinder is provided with an opening joined with an external pipe branch.

The upper section of the removable metal cylinder can be terminated with a removable neck with an internal diameter that fits the outer diameter of its fitted cooking pot.

In this case, the removable neck is provided with openings to release supplied hot air or another hot gaseous medium.

The outer edge of this removable neck is provided with a skirting directed downwards with the internal diameter, which fits the external diameter of the removable metal cylinder.

To achieve further improvement in heat transfer from the flowing hot air to the cooking pot it is possible to apply a corrugated netting or a corrugated perforated sheet, which is shaped as a removable vertical cylinder with a vertical direction of peaks and depressions of its corrugations, wherein the internal diameter of this removable corrugated cylinder is larger than the outer diameter of the cooking pot and its external diameter is smaller than the internal diameter of the removable metal cylinder.

The internal surface of this removable corrugated cylinder has a high coefficient of absorption/emissivity of electromagnetic radiation in the infrared range of the spectrum.

This removable corrugated cylinder serves as a removable insert, wherein its corrugations serve as spacers and increase additionally the surface of emittance of the infrared electromagnetic radiation.

In another version, the upper section of the removable metal cylinder is terminated with a removable circular tray with a central circular opening, which is provided with an internal skirting directed downwards; this internal skirting has an outer diameter that fits or is less than the internal diameter of the removable metal cylinder.

The external skirting of the removable circular tray, which is directed upwards, is provided with openings for the release of the air.

This external skirting can be designed in a two-stage form, wherein the lower external skirting stage is provided with multiple openings and the upper external skirting stage serves for a pan's positioning for stewing, frying, or other cooking processes.

In addition, this removable circular tray can be used for baking. In this case, the upper external skirting is not provided with openings, but it is applied for positioning a removable circular lid with a central opening to release hot air or another hot gaseous medium. The internal surface of the removable circular lid can be covered with a coating with a high emissivity coefficient in the infrared range of electromagnetic radiation.

To enhance heat transfer from the hot air to the pan's bottom, it is possible to apply a removable insert shaped as a metal disc with multiple perforations, or a metal disc from wire netting.

In both cases, the metal disk has some circular wave-wise deformations or multiple bulges, wherein the heights of these deformations fit the height of the external skirting (or the lower external skirting stage) of the removable circular tray.

The upper surface of the metal disk is covered with a coating with a high emissivity coefficient in the infrared range of electromagnetic radiation.

Application of such a removable insert is desirable if the lower surface of the pan has a high absorption coefficient in the infrared range of electromagnetic radiation.

In an additional version, the upper section of the removable metal cylinder is terminated with a removable rectangular tray with a central circular opening, which is provided with an internal skirting directed downwards; this internal skirting has an outer diameter that fits or is less than the internal diameter of the removable metal cylinder.

The external skirting of the removable rectangular tray, which is directed upwards, is provided with openings for the release of the air.

This external skirting can be designed in a two-stage form, wherein the lower stage of the external skirting serves for a rectangular pan's positioning in stewing, frying, or baking. In this case, the horizontal section of the external skirting is applied to position a removable rectangular lid with a central opening to release hot air or another heating gaseous medium. The internal surface of the removable rectangular lid can be covered with a coating with a high emissivity coefficient in the infrared range of electromagnetic radiation.

To enhance heat transfer from the hot air to the rectangular pan's bottom, it is possible to apply a removable insert shaped as a metal sheet with multiple perforations, or from wire netting.

In both cases, the metal sheet has some corrugation-wise deformations or multiple bulges, wherein the heights of these deformations fit the height of the removable rectangular tray's external skirting (or the lower external skirting stage).

The upper surface of the metal rectangular sheet is covered with a coating with a high emissivity coefficient in the infrared range of electromagnetic radiation.

Application of such a removable insert is desirable if the lower surface of the rectangular pan has a high absorption coefficient in the infrared range of electromagnetic radiation.

There is an inlet pipe branch that is installed at the lower section of the external and internal housings via the thermal insulation and protrudes inwards and outwards relating the internal and external housings.

In addition, one wall of the cooking box is provided with an opening, which can be terminated with an external pipe branch intended to recirculation hot air into its source. The flat pedestal is provided with a radial groove, which allows the establishment of the pipe branch of the removable metal cylinder aligned with the inlet pipe branch of the cooking box.

The lower external surface of each removable metal cylinder is provided with a projection with a width, which fits the width of the radial groove of the flat pedestal. It allows the establishment of the removable metal cylinder in the right position relative to the second branch pipe.

A displaceable connection pipe serves for the fluid communication of the inlet pipe branch and the pipe branch of the removable metal cylinder.

This displaceable connection pipe is provided preferably with a bellows section.

In another version, this displaceable connector pipe can be manufactured from nonpermeable fabric that is terminated with two metal connectors for fluid communication with the inlet pipe branch and the pipe branch of the removable metal cylinder.

The cooking box can be equipped with a means for heat storage for cooking in the cooking box at nighttime when a solar concentrating collector supplying hot air into the cooking box is not functioning.

The upper layer of the flat pedestal is provided in this case with a second radial groove, which is perpendicular to the first radial groove.

It allows the orientation of the removable metal cylinder with its pipe branch toward the internal wall of the cooking box, which is perpendicular to the wall of the cooking box with the second pipe branch.

There is a first rectangular wide bracket, which is installed on this second wall opposite the pipe branch of the removable metal cylinder in its second position.

The first rectangular wide bracket is provided with a circular opening, which is overlapped by a first fan's flange installed on the rectangular wide bracket.

The opposite flange of the first fan is coupled with a pipe branch, which is intended for fluid communication with the pipe branch of the removable metal cylinder installed on the flat pedestal through the telescopic connection pipe or the fabric pipe terminated with two metal connectors.

There is a bank of sealed flat vessels filled with a phase change material (PCM) with a melting temperature somewhat lower than the temperature of hot air supplied into the cooking box.

These sealed flat vessels are arranged vertically in parallel with a certain gap between them and at a certain distance regarding an internal wall of the cooking box, which is perpendicular to the sealed flat vessels.

The second rectangular wide bracket is provided with a circular opening, which is overlapped by a second fan's flange installed on the rectangular wide bracket. The opposite flange of the second fan is coupled with a trumpet's narrow opening and the size of its wider opening fits the size of the sealed flat vessels' set.

The sealed flat vessels filled with PCM perform charging heat when hot air is supplied into the cooking box and discharging heat when hot air is not supplied and the cooking process should be performed. During both cases, the second fan is activated.

The first fan is activated preferably during the supply of hot air into the cooking box without performing the cooking process and during performing the cooking process without a supply of externa hot air into the cooking box.

The cooking box is provided as well with auxiliary equipment: a small photovoltaic panel, a battery of DC, and an inverter for inverting DC in AC.

BRIEF DESCRIPTION OF THE DRAWINGS

FIG. 1A shows a front view of a removable metal cylinder with its removable neck with its upper openings, which is installed on a flat pedestal at the bottom of a cooking box.

FIG. 1B shows a lateral view of the removable metal cylinder with its removable neck and upper openings, which is installed on the flat pedestal at the bottom of the cooking box.

FIG. 2A shows a lateral view of the flat pedestal.

FIG. 2B shows a view from above of the flat pedestal.

DETAILED DESCRIPTION OF THE INVENTION

Figure 1D:
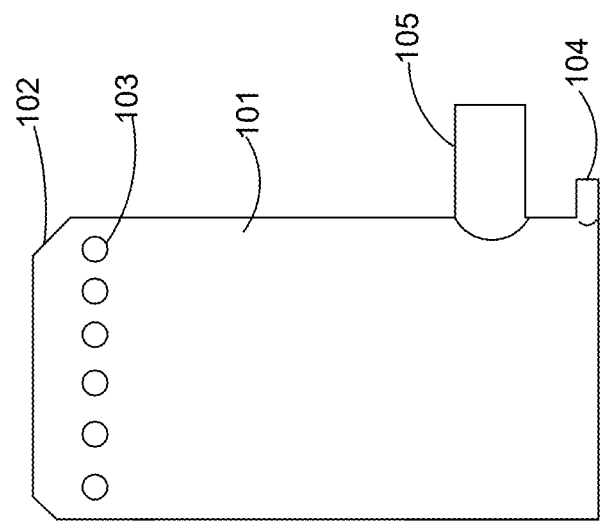
FIG. 1D shows a lateral view of a removable metal cylinder with its neck and upper openings, which is installed on the flat pedestal, which is joined with the bottom of the cooking box.
Figure 1C:
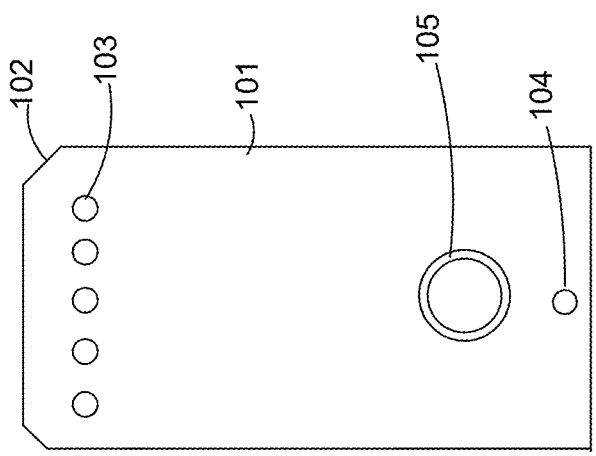
FIG. 1C shows a front view of the removable metal cylinder with its neck and upper openings; this removable metal cylinder is installed on the flat pedestal at the bottom of the cooking box.
Figure 1E:
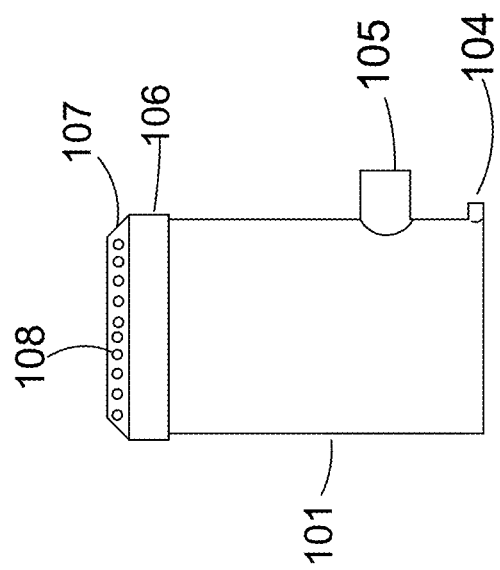
FIG. 1E shows a front view of the removable metal cylinder with its removable neck and upper openings in this removable neck; this removable metal cylinder is installed on the flat pedestal at the bottom of the cooking box.
Figure 1F:
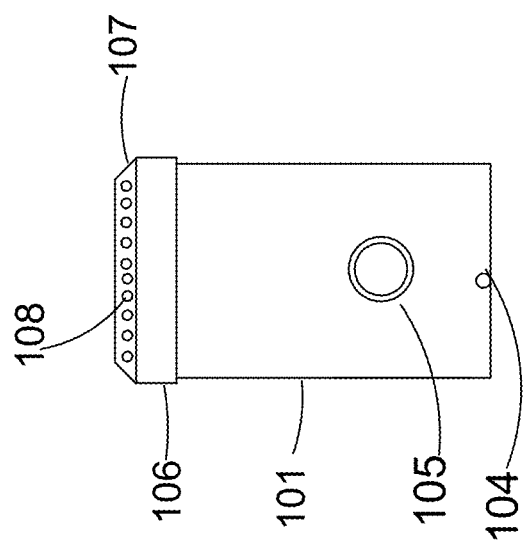
FIG. 1F shows a view from above of the removable metal cylinder with its removable neck and upper openings in this removable neck; this removable metal cylinder is installed on the flat pedestal at the bottom of the cooking box.
Figure 3A:
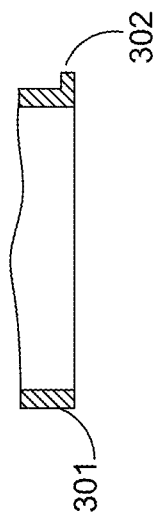
FIG. 3A shows an axial cross-section of the lower section of the removable metal cylinder.
Figure 3B:
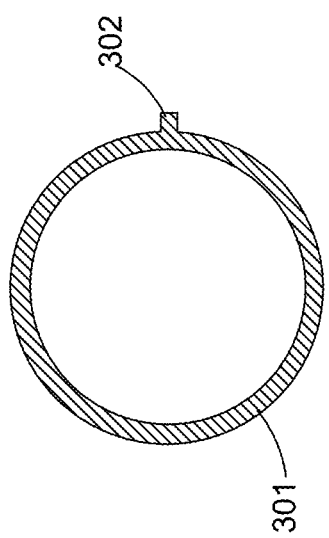
FIG. 3B shows a radial cross-section of the lower section of the removable metal cylinder.
Figure 4:
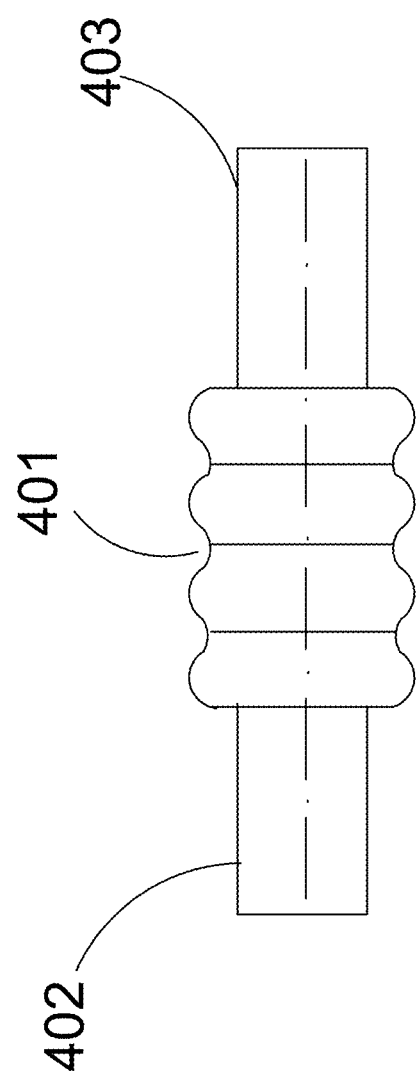
FIG. 4 shows a butt weld expansion joint for fluid communication between a pipe branch of a removable metal cylinder and an inlet pipe branch of a cooking box.
Figure 5:
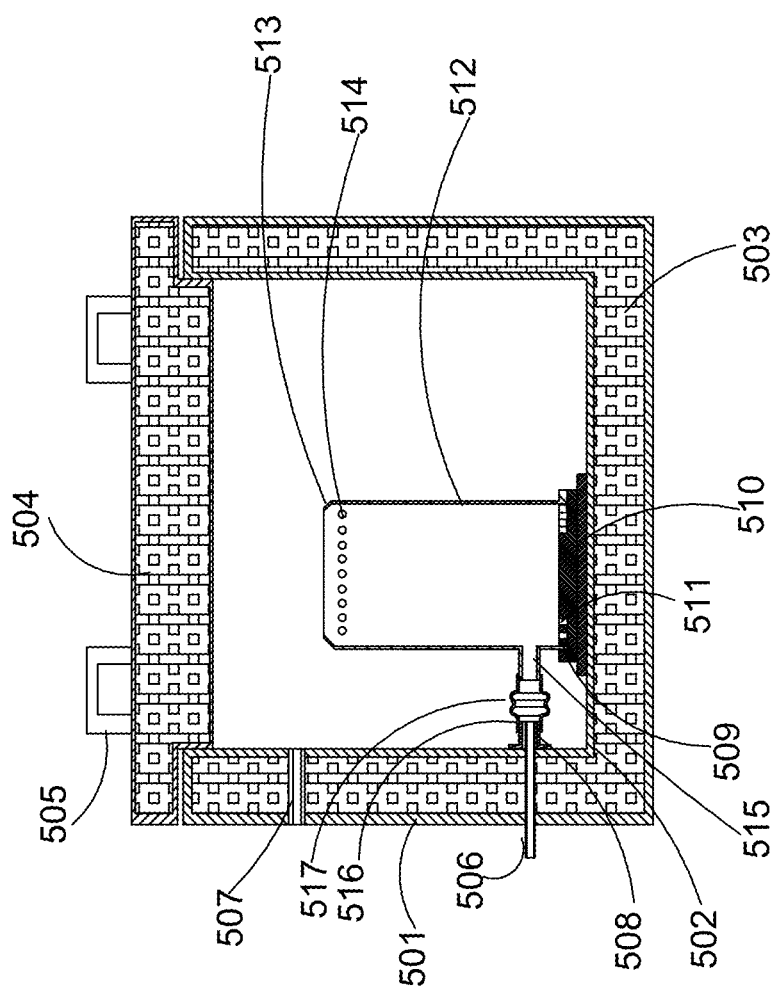
FIG. 5 shows a vertical cross-section of a cooking box with a flat pedestal, a removable metal cylinder, and a pipe for fluid communication between a pipe branch of a removable metal cylinder and an inlet pipe branch.
Figure 6:
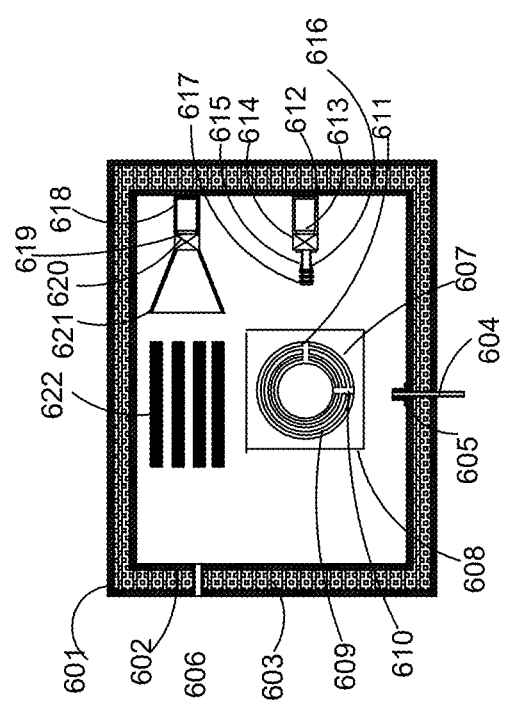
FIG. 6 shows the view from above of a horizontal cross-section of a cooking box, which comprises a removable metal cylinder.
Figure 7A:
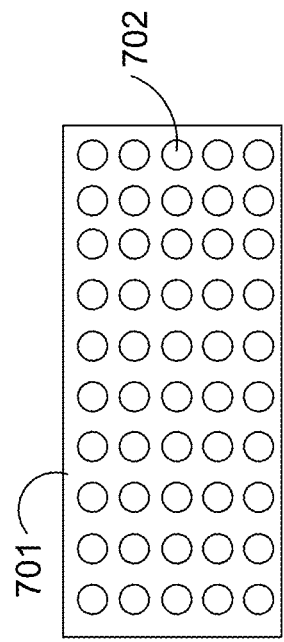
FIG. 7A shows a perforated metal sheet used as a workpiece for the fabrication of a corrugated cylinder to be inserted between a removable metal cylinder and a cooking pot.
Figure 7B:
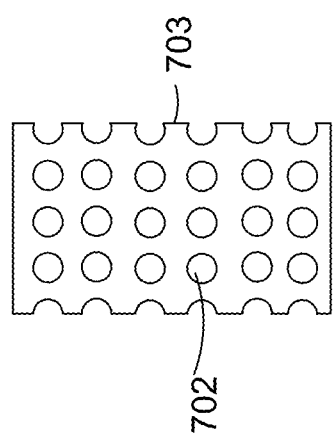
FIG. 7B shows a lateral view of the corrugated cylinder.
Figure 7C:
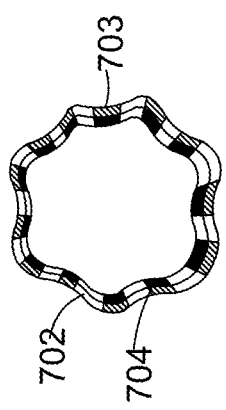
FIG. 7C shows an axial cross-section of the corrugated cylinder.
Figure 8C:
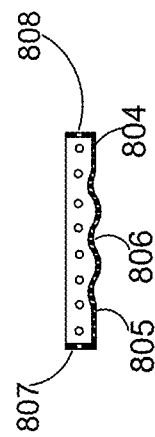
FIG. 8C shows a view of the circular disk from above.
Figure 8D:
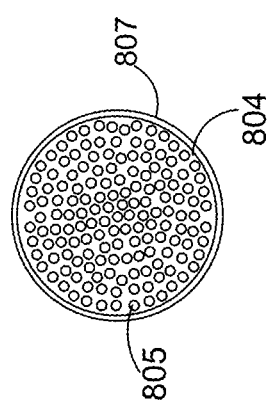
FIG. 8D shows a view from above of the circular disk with the perforated skirting.
Figure 8A:
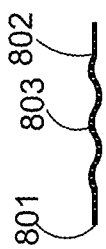
FIG. 8A shows an axial cross-section of a circular disk with bulges.
Figure 8B:
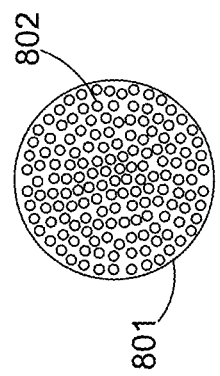
FIG. 8B shows an axial cross-section of a circular disk with its perforated skirting directed upwards.
Figure 9A:
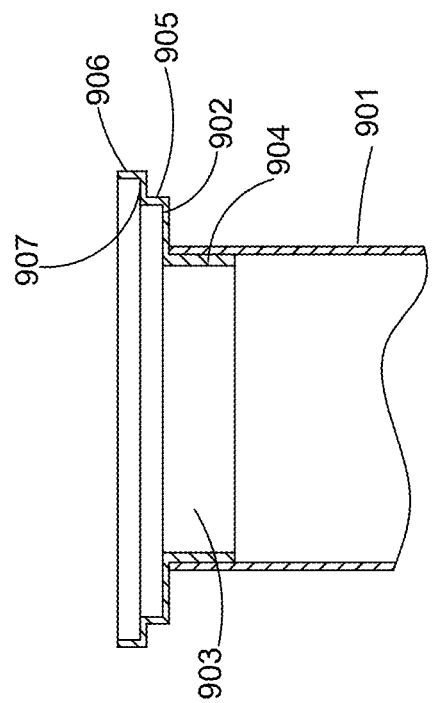
FIG. 9A shows an axial cross-section of a removable circular neck applied for pans' positioning and an upper section of a removable metal cylinder.
Figure 9B:
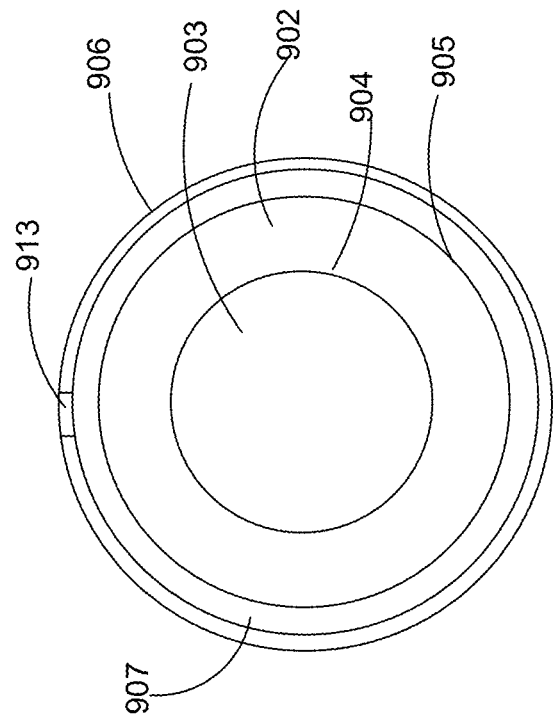
FIG. 9B shows a view from above of the removable circular tray.

1. FIG. 1A shows a front view of a removable metal cylinder, which will be installed on a flat pedestal at the bottom of a cooking box.
2. This drawing comprises a removable metal cylinder 101, a cylindrical projection 104 on the lower surface of the removable cylinder 101, and a pipe branch 105 at the lower section of the removable metal cylinder 101.
3. FIG. 1B shows a lateral view of the removable metal cylinder installed on the flat pedestal at the bottom of the cooking box.
4. This drawing comprises the removable metal cylinder 101, the cylindrical projection 104 on the lower surface of the removable metal cylinder 101, and the pipe branch 105 at the lower section of the removable metal cylinder 101.
5. FIG. 1C shows a front view of the removable metal cylinder with its neck and upper openings; this removable metal cylinder is installed on the flat pedestal at the bottom of the cooking box.
6. This drawing comprises the removable metal cylinder 101 with its neck 102, openings 103 at the upper section of the removable metal cylinder 101, the cylindrical projection 104 on the lower surface of the removable cylinder 101, and the pipe branch 105 at the lower section of the removable metal cylinder 101.
7. FIG. 1D shows a lateral view of a removable metal cylinder with its neck and upper openings, which is installed on the flat pedestal, which is joined with the bottom of the cooking box.
8. This drawing comprises the removable metal cylinder 101 with its neck 102, openings 103 at the upper section of the removable metal cylinder 101, the cylindrical projection 104 on the lower surface of the removable cylinder 101, and the pipe branch 105 at the lower section of the removable metal cylinder 101.
9. FIG. 1E shows a front view of the removable metal cylinder with its removable neck and upper openings in this removable neck; this removable metal cylinder is installed on the flat pedestal at the bottom of the cooking box.
10. This drawing comprises the removable metal cylinder 101 with its neck, which includes a low cylindrical section 106 and an upper section 107 shaped as a truncated cone, and openings 108 at the upper section 107 of the removable neck, the cylindrical projection 104 on the lower surface of the removable cylinder 101, and the pipe branch 105 at the lower section of the removable metal cylinder 101.
11. FIG. 1F shows a view from above of the removable metal cylinder with its removable neck and upper openings in this removable neck; this removable metal cylinder is installed on the flat pedestal at the bottom of the cooking box.
12. This drawing comprises the removable metal cylinder 101 with its neck, which includes a low cylindrical section 106 and an upper section 107 shaped as a truncated cone, and openings 108 at the upper section 107 of the removable neck, the cylindrical projection 104 on the lower surface of the removable cylinder 101, and the pipe branch 105 at the lower section of the removable metal cylinder 101.
13. FIG. 2A shows an axial cross-section of a flat pedestal.
14. It comprises a flat pedestal 201 with basis 202, concentric circular grooves 203, and two radial grooves 204, which are situated at 90° mutually.
15. FIG. 2B shows a view from above of the flat pedestal.
16. It comprises a flat pedestal 201 with basis 202, concentric circular grooves 203, and two radial grooves 204, which are situated at 90° mutually.
17. FIG. 3A shows an axial cross-section of the lower section of the removable metal cylinder.
18. It comprises the lower cylindrical section 301 and a cylindrical projection 302.
19. FIG. 3B shows a view from above the radial cross-section of the removable metal cylinder.
20. It comprises the lower cylindrical section 301 and the cylindrical projection 302.
21. FIG. 4 shows a butt weld expansion joint for fluid communication between a pipe branch of a removable metal cylinder and an inlet pipe branch of a cooking box.
22. It comprises a bellows section 401, an inlet tubular piece 402, and an outlet tubular piece 403.
23. FIG. 5 shows a vertical cross-section of a cooking box with a flat pedestal, a removable metal cylinder, and a pipe for fluid communication between a pipe branch of a removable metal cylinder and an inlet pipe branch.
24. It comprises an external housing 501 of a cooking box, an internal housing 502, thermal insulation 503, a lid 504 with handles 505, an inlet pipe branch 506 with bushing 508, an outlet port 507, a flat pedestal 509 with its basis 510 and circular grooves 511 and a radial groove 519, a removable metal cylinder 512, which is fastened in the circular groove 511; this removable metal cylinder 512 is provided with neck 513, openings 514 at its upper section, projection 518 at its lower section and a pipe branch 515 at its lower section; a connecting pipe (butt weld expansion joint) 516 with bellows 517, which performs fluid communication between the pipe branch 515 and the inlet pipe branch 506.
25. FIG. 6 shows the view from above of a horizontal cross-section of a cooking box, without a removable metal cylinder,
26. It comprises an external housing 601 of a cooking box, an internal housing 602, thermal insulation 603, an inlet pipe branch 604, bushing 605 installed in the first wall of the cooking box, an outlet port with an external pipe branch 606, a flat pedestal 607 with its basis 608; the flat pedestal 607 is provided as well with circular grooves 609 and radial grooves 610 and 611, which are perpendicular mutually; a first wide bracket 612 with a rectangular shape is installed on the neighboring wall to the first wall; this first wide bracket has a circular opening 613 at its bridge; in addition, this bridge serves for installation of a first fan 614 with its flange, wherein another flange of the first fan 614 serves for installation of a first pipe branch 615 with a removable connecting pipe 616, which is provided with bellows 617.
27. There is a second wide bracket 618 with a rectangular shape, which is installed on the wall of the cooking box; this second wide bracket has a circular opening 619 at its bridge; in addition, this bridge serves for installation of a second fan 620 with its flange, wherein another flange of the second fan 620 serves for installation of a narrow opening of trumpet 621. There is a bank of sealed flat vessels 622 filled with a phase change material (PCM) with a melting temperature somewhat lower than the temperature of hot air supplied into the cooking box. These sealed flat vessels 622 are arranged vertically in parallel with a certain gap between them and at a certain distance regarding the wide opening of trumpet 621, wherein the sealed flat vessels 622 are arranged perpendicularly regarding the wall used for installation of the second wide bracket 618.
28. FIG. 7A shows a perforated metal sheet used as a workpiece for the fabrication of a corrugated cylinder to be inserted between a removable metal cylinder and a cooking pot.
29. It comprises sheet 701 with openings 702.
30. FIG. 7B shows a lateral view of the corrugated cylinder.
31. It comprises the corrugated cylinder 703 with openings 702.
32. FIG. 7C shows an axial cross-section of the corrugated cylinder. It comprises a corrugated cylinder 703 with openings 702 and an internal coating 704 with a high emissivity coefficient in the infrared range of electromagnetic radiation.
33. FIG. 8A shows an axial cross-section of a circular disk with bulges.
34. It comprises a disk 801 with perforations 802 and bulges 803.
35. FIG. 8B shows an axial cross-section of a circular disk with bulges and a perforated skirting directed upwards. It comprises a disk 804 with perforations 805, bulges 806, skirting 807 with its perforations 808.
36. FIG. 8C shows a view from above of the circular disk of FIG. 8a.
37. It comprises a disk 801 with perforations 802.
38. FIG. 8D shows a view from above of the circular disk with the perforated skirting.
39. It comprises a disk 804 with perforations 805 and skirting 807.
40. FIG. 9A shows an axial cross-section of a removable circular tray applied for pans' positioning and an upper section of a removable metal cylinder.
41. It comprises an upper section 901 of the removable metal cylinder, a removable circular tray 902 with a central opening 903, and its skirting 904 directed downwards. The outer edge of the removable circular tray 902 is provided with a two-stage skirting comprising a lower stage 905, an upper stage 906, and a horizontal annular section 907.
42. FIG. 9B shows a view from above of the removable circular tray.
43. It comprises the removable circular tray 902 with the central opening 903. The outer edge of the removable circular tray 902 is provided with the two-stage skirting comprising the lower stage 905, the upper stage 906, and the horizontal annular section 907. The upper stage 906 has cutout 913 for positioning a pan's handle.

Figure 9C:
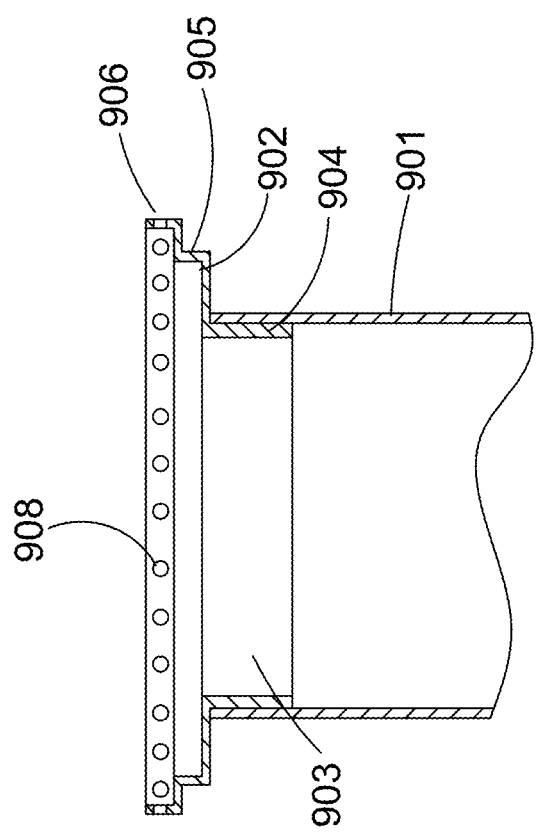
FIG. 9C shows an axial cross-section of a removable circular tray with the upper section of the removable metal cylinder, wherein an upper stage of the removable circular tray's skirting is perforated.
Figure 9E:
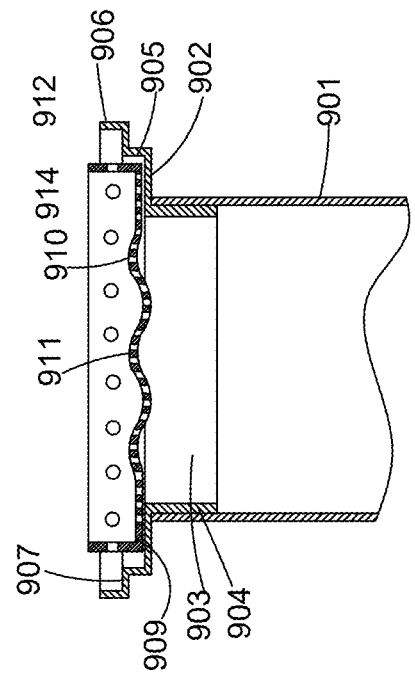
FIG. 9E shows an axial cross-section of a the removable circular tray with the upper section of the removable metal cylinder, wherein a perforated disk with its perforated skirting is positioned on the horizontal section of the two-stage skirting of the removable circular tray.
Figure 9D:
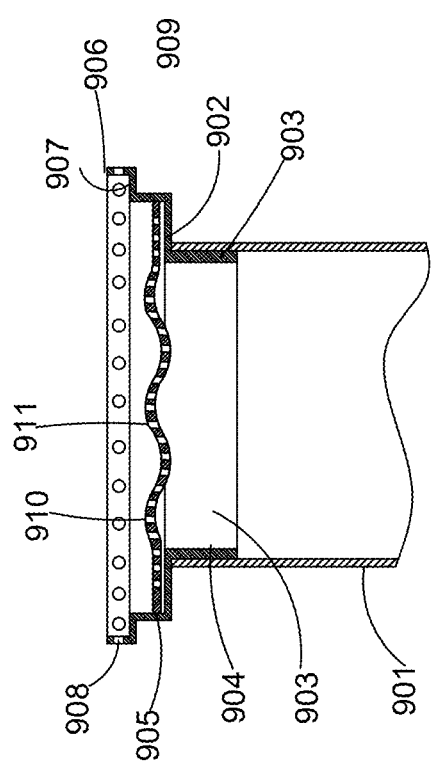
FIG. 9D shows an axial cross-section of a removable circular tray with the upper section of the removable metal cylinder, wherein an upper stage of the removable circular tray's skirting is perforated, and a perforated disk is positioned on the horizontal section of the two-stage skirting of the removable circular tray.
Figure 9F:
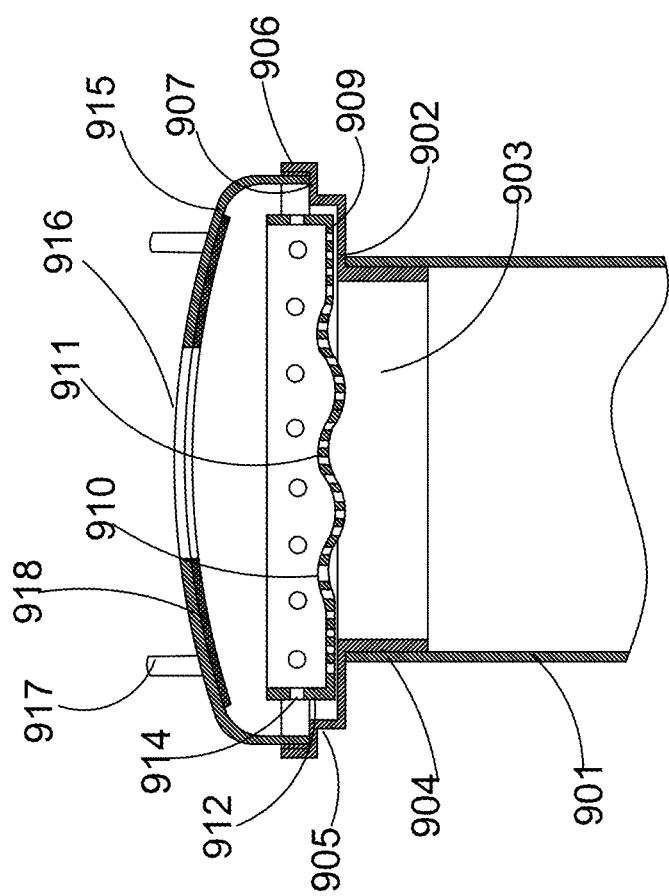
FIG. 9F shows an axial cross-section of the removable circular tray with the upper section of the removable metal cylinder, wherein the perforated disk with its perforated skirting is positioned on the horizontal section of the two-stage skirting of the removable circular tray. A lower edge of a lid is placed on the horizontal section of the removable circular tray's two-stage skirting.
Figure 10A:
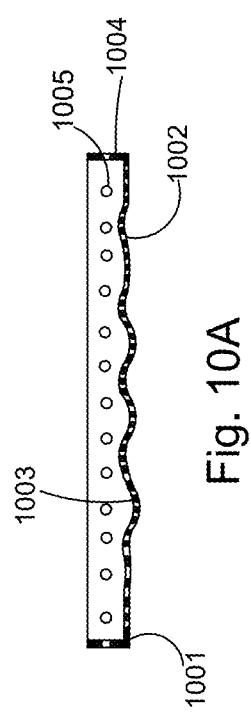
FIG. 10A shows a view from above of a rectangular perforated sheet with a perforated skirting directed upwards.
Figure 10B:
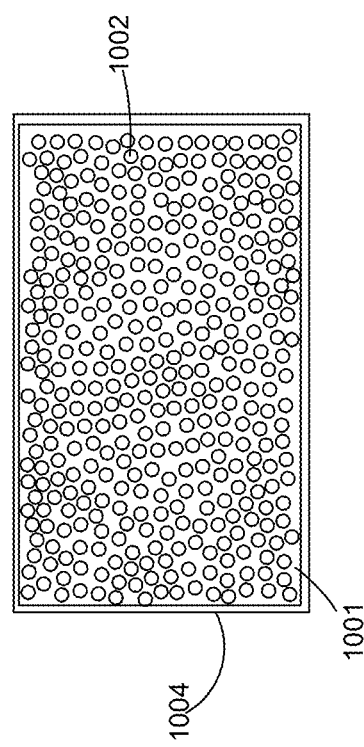
FIG. 10B shows a vertical cross-section of the rectangular perforated sheet with bulges and the perforated skirting directed upwards.
Figure 11A:
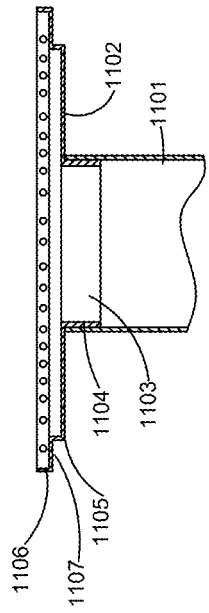
FIG. 11A shows an axial cross-section of a removable rectangular tray with the upper section of the removable metal cylinder.
Figure 11B:
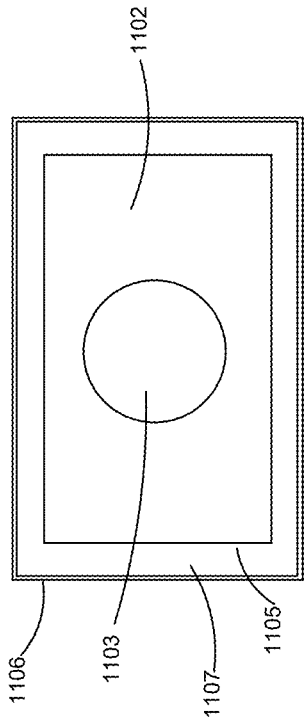
FIG. 11B shows a view from above of the removable rectangular tray.
Figure 11C:
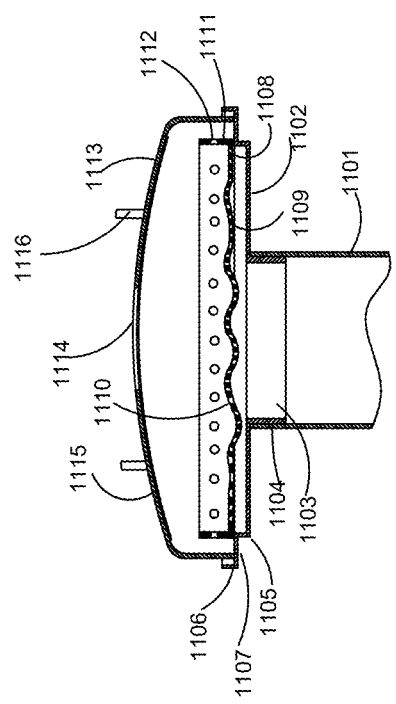
FIG. 11C shows an axial cross-section of a removable rectangular tray with the upper section of the removable metal cylinder, wherein a perforated sheet is positioned on the horizontal section of the two-stage skirting of the removable rectangular tray.

44. FIG. 9C shows an axial cross-section of a removable circular tray with the upper section of the removable metal cylinder, wherein an upper stage of the removable circular tray's skirting is perforated.
45. It comprises an upper section 901 of the removable metal cylinder, the removable circular tray 902 with the central opening 903, and its skirting 904 directed downwards. The outer edge of the removable circular tray 902 is provided with the two-stage skirting comprising the lower stage 905, the upper stage 907 with perforations 908, and the horizontal annular section 907.
46. FIG. 9D shows an axial cross-section of the removable circular tray with the upper section of the removable metal cylinder, wherein the upper stage of the removable circular tray's skirting is perforated, and a perforated disk is positioned on the horizontal section of the two-stage skirting.
47. It comprises the upper section 901 of the removable metal cylinder, the removable circular tray 902 with the central opening 903, and its skirting 904 directed downwards. The outer edge of the removable circular tray 902 is provided with the two-stage skirting comprising the lower stage 905, the upper stage 906 with perforations 908, and the horizontal annular section 907. A metal disk 909 with perforations 910 and bulges 911 is placed on the horizontal annular section 906, the upper surface of this metal disk 909 is coated with a black coating with a high emissivity value in the infrared range of the electromagnetic spectrum.
48. FIG. 9E shows an axial cross-section of a removable circular tray with the upper section of the removable metal cylinder, wherein a perforated disk with a skirting directed upwards is placed on the horizontal section of the two-stage skirting.
49. It comprises the upper section 901 of the removable metal cylinder, the removable circular tray 902 with the central opening 903, and its skirting 904 directed downwards. The outer edge of the removable circular tray 902 is provided with the two-stage skirting comprising the lower stage 905, the upper stage 906 with perforations 908, and the horizontal annular section 907. A metal disk 909 with perforations 910, bulges 911, and skirting 912 with perforations 914 is placed on the horizontal annular section 906, the upper surface of this metal disk 909 is coated with a black coating with a high value of emissivity in the infrared range of the electromagnetic spectrum.
50. FIG. 9F shows an axial cross-section of the removable circular tray with the upper section of the removable metal cylinder, wherein the perforated disk with its perforated skirting is positioned on the horizontal section of the two-stage skirting of the removable circular tray. A lower edge of a lid is placed on the horizontal section of the removable circular tray's two-stage skirting.
51. This drawing comprises the upper section 901 of the removable metal cylinder, the removable circular tray 902 with the central opening 903, and its skirting 904 directed downwards. The outer edge of the removable circular tray 902 is provided with the two-stage skirting comprising the lower stage 905, the upper stage 906 with perforations 908, and the horizontal annular section 907.
52. A metal disk 909 with perforations 910, bulges 911, and skirting 912 with perforations 914 is placed on the horizontal annular section 906, the upper surface of this metal disk 909 is coated with a black coating with a high value of emissivity in the infrared range of the electromagnetic spectrum.
53. Lid 915 is placed with its lower edge on the horizontal annular section 906.
54. Lid 915 has a central opening 916, handles 917, and a black coating 918 on the internal surface; this black coating has a high emissivity value in the electromagnetic spectrum's infrared range.
55. FIG. 10a shows a vertical cross-section of a rectangular perforated sheet with a perforated skirting directed upwards.
56. It comprises the removable rectangular sheet 1001 with perforations 1002, bulges 1003, and skirting 1004 with perforations 1005.
57. FIG. 10b shows a view from above of the rectangular perforated sheet with bulges and the perforated skirting directed upwards.
58. It comprises the rectangular sheet 1001 with perforations 1002 and skirting 1004.
59. FIG. 11A shows an axial cross-section of a removable rectangular tray with the upper section of the removable metal cylinder.
60. This drawing comprises an upper section 1101 of a removable metal cylinder, a removable rectangular tray 1102 with a central circular opening 1103, and its skirting 1104 directed downwards. The outer edge of the removable rectangular tray 1102 is provided with a two-stage skirting directed upwards, which comprises a lower stage 1105, an upper stage 1106, and a horizontal section 1107.
61. FIG. 11B shows a view from above of the removable rectangular tray.
62. This drawing comprises the upper section 1101 of the removable metal cylinder, the removable rectangular tray 1102 with the central circular opening 1103, and its skirting 1104 directed downwards. The outer edge of the removable rectangular tray 1102 is provided with the two-stage skirting comprising the lower stage 1105, the upper stage 1106, and the horizontal section 1107.
63. FIG. 11C shows an axial cross-section of a removable rectangular tray with the upper section of the removable metal cylinder, wherein a perforated sheet is positioned on the horizontal section of the two-stage skirting of the removable rectangular tray. A lower edge of a lid is placed on the horizontal section of the removable rectangular tray's two-stage skirting.
64. This drawing comprises the upper section 1101 of the removable metal cylinder, the rectangular tray 1102 with the central circular opening 1103, and its skirting 1104 directed downwards. The outer edge of the removable rectangular tray 1102 is provided with the two-stage skirting directed upwards, which comprises the lower stage 1105, the upper stage 1106, and the horizontal section 1107. The metal rectangular sheet 1108 with perforations 1109, bulges 1110, and skirting 1111 with perforations 1112 is placed on the horizontal section 1107, the upper surface of this metal rectangular sheet 1108 is coated with a black coating with a high value of emissivity in the infrared range of the electromagnetic spectrum.

65. A rectangular lid 1113 is placed with its lower edge on the horizontal section 1107.

66. The rectangular lid 1113 has a central opening 1114, a black coating 1115 with a high emissivity value in the electromagnetic spectrum's infrared range, and handles 1116.

The invention claimed is:

1. A cooking box, which functions with an external source of hot air or another hot gaseous medium, said cooking box comprises: an internal housing, thermal insulation of lateral walls and a bottom of said cooking box, and an external housing; a lid with thermal insulation closes said cooking box; said lid is provided with removing appliances; an inlet pipe branch that is installed at the lower section of said external and internal housings via said thermal insulation and protrudes inwards and outwards relating to said internal and external housings; an outlet port for release of the air from said cooking box; a flat pedestal, which is established via a basis plate on the bottom of said internal housing; said flat pedestal comprises several concentric grooves and one (or two) radial groove(s), said concentric and radial grooves are intended for setting removable metal cylinders; said removable metal cylinders, in turn, serve for setting cooking pots or cooking pans of different diameters; the internal diameter of each said removable metal cylinder is larger than the outer diameter of its corresponding cooking pot; the lower section of each said removable metal cylinder is provided with an opening joined with an external a pipe branch; the lowest external surface of each said removable metal cylinder is provided with a projection with a width, which fits the width of said flat pedestal's radial groove(s); a displaceable connection pipe serves for the fluid communication of said inlet pipe branch and said pipe branch of said removable metal cylinder.

2. The cooking box, which functions with an external source of hot air or another hot gaseous medium as claimed in claim 1, wherein the upper edge of the removable metal cylinder is terminated with a neck with an internal diameter that fits the outer diameter of its fitted cooking pot; the upper section of said removable metal cylinder is provided with openings to release supplied hot air.

3. The cooking box, which functions with an external source of hot air or another hot gaseous medium as claimed in claim 1, wherein the upper section of the removable metal cylinder is provided with a removable neck; said removable neck has a lower cylindrical section with the internal diameter, which fits the outer diameter of said removable metal cylinder; the upper section of said removable neck is shaped as a truncated cone with an internal diameter of its upper edge that fits the outer diameter of its fitted cooking pot; said truncated cone is provided with openings to release supplied hot air.

4. The cooking box, which functions with an external source of hot air or another hot gaseous medium as claimed in claim 1, wherein there is a removable insert from a corrugated netting or a corrugated perforated sheet, which is shaped as a vertical cylinder with a vertical direction of peaks and depressions of its corrugations, and the internal diameter of said corrugated cylinder is larger than the outer diameter of a cooking pot and its external diameter is smaller than the internal diameter of the removable metal cylinder; the internal surface of said corrugated cylinder has a high coefficient of absorption/emissivity of electromagnetic radiation in the infrared range of the spectrum.

5. The cooking box, which functions with an external source of hot air or another hot gaseous medium as claimed in claim 1, wherein the upper section of the removable metal cylinder is terminated with a removable insert shaped as a circular tray with a central circular opening, which is provided with an internal skirting directed downwards; said internal skirting has an outer diameter that fits or is less than the internal diameter of said removable metal cylinder;

said circular tray has an external skirting, which is directed upwards; said external skirting is designed in a two-stage form, wherein the lower external skirting stage is provided with multiple openings and the upper external skirting stage serves for a pan's positioning for stewing, frying, or other cooking processes;

a removable insert shaped as a metal disc, which is provided with a central circular opening and with multiple perforations or it is shaped as a metal disc from wire netting with its central opening; said metal disk is positioned on the bottom of said circular tray; said metal disk has some circular wave-wise deformations; the heights of said circular wave-wise deformations fit the height of said lower stage of said external skirting of said removable circular tray; the upper surface of said metal disk is covered with a coating with a high emissivity coefficient in the infrared range of electromagnetic radiation.

6. The cooking box, which functions with an external source of hot air or another hot gaseous medium as claimed in claim 1, wherein the upper section of the removable metal cylinder is terminated with a removable insert shaped as a rectangular tray with a central circular opening, which is provided with an internal skirting directed downwards;

said internal skirting has an outer diameter that fits or is less than the internal diameter of said removable metal cylinder;

said rectangular tray has an external skirting, which is directed upwards;

said external skirting is designed in a two-stage form, wherein the lower external skirting stage is provided with multiple openings and the upper external skirting stage serves for a rectangular pan's positioning for stewing, frying, or other cooking processes;

a removable insert shaped as a metal rectangular sheet which is provided with a central circular opening and with multiple perforations or it is shaped as a rectangular wire netting with its central opening; said metal rectangular sheet is positioned on the bottom of said rectangular tray; said rectangular wire netting has some corrugations; the heights of said corrugations fit the height of said lower stage of said external skirting of said removable rectangular tray; the upper surface of said metal rectangular sheet is covered with a coating with a high emissivity coefficient in the infrared range of electromagnetic radiation.

7. The cooking box, which functions with an external source of hot air or another hot gaseous medium as claimed in claim 1, wherein the outlet port is joined with an external pipe branch.

8. The cooking box, which functions with an external source of hot air or another hot gaseous medium as claimed in claim 1, wherein the displaceable connector pipe is manufactured from nonpermeable fabric that is terminated with two metal connectors for fluid communication with the inlet pipe branch and with the pipe branch of the removable metal cylinder.

9. A cooking box, which functions with an external source of hot air or another hot gaseous medium, said cooking box comprises: an external housing, thermal insulation of lateral walls and a bottom of said cooking box, and an internal housing; a lid with thermal insulation closes this cooking box; the lid is provided with removing appliances; an inlet pipe branch that is installed at the lower section of said external and internal housings via said thermal insulation and protrudes inwards and outwards relating said internal and external housings; an outlet port for release of air from said cooking box; a flat pedestal, which is established via a basis plate on the bottom of said internal housing; said flat pedestal comprises several concentric grooves and two radial grooves, which are situated at 90° mutually; said concentric and radial grooves are intended for setting removable metal cylinders, which, in turn, serve for setting cooking pots or cooking pans of different diameters; the internal diameter of each said removable metal cylinder is larger than the outer diameter of its corresponding cooking pot; the lower section of each said removable metal cylinder is provided with an opening with an external a pipe branch; the lowest external surface of each said removable metal cylinder is provided with a projection with a width, which fits the width of said flat pedestal's radial groove; a displaceable connection pipe serves for the fluid communication of between said inlet pipe branch and said pipe branch of said removable metal cylinder; a first wide bracket with a rectangular shape is installed on the internal neighboring wall of to the first wall; said first wide bracket has a circular opening at its bridge; said bridge serves for installation of a first fan via its flange, wherein another flange of said first fan serves for installation of a first pipe branch with a removable connecting pipe that is provided with a bellows section; a second wide bracket of a rectangular shape is installed on an internal wall of said cooking box; said second wide bracket has a circular opening at its bridge; a second fan is installed on said wide bridge with its flange; a trumpet via its narrow opening is joined with another flange of said second fan; a bank of sealed flat vessels is installed in said cooking box; said sealed flat vessels are filled with a phase change material (PCM) with a melting temperature somewhat lower than the temperature of hot air or another hot gaseous medium supplied into said cooking box; said sealed flat vessels are arranged vertically in parallel with a certain gap between them and at a certain distance regarding the wide opening of said trumpet, wherein said sealed flat vessels are arranged perpendicularly regarding said wall used for installation of said second wide bracket.

10. The cooking box, which functions with an external source of hot air or another hot gaseous medium as claimed in claim 9, wherein the upper section of the removable metal cylinder is provided with a removable neck with an internal diameter that fits the outer diameter of its fitted cooking pot; said removable neck is provided with openings to release supplied hot air.

11. The cooking box, which functions with an external source of hot air or another hot gaseous medium as claimed in claim 9, wherein there is a removable insert from a corrugated netting or a corrugated perforated sheet, which is shaped as a vertical cylinder with a vertical direction of peaks and depressions of its corrugations, and the internal diameter of said corrugated cylinder is larger than the outer diameter of a cooking pot and its external diameter is smaller than the internal diameter of the removable metal cylinder; the internal surface of said corrugated cylinder has a high coefficient of absorption/emissivity of electromagnetic radiation in the infrared range of the spectrum.

12. The cooking box, which functions with an external source of hot air or another hot gaseous medium as claimed in claim 9, wherein the upper section of the removable metal cylinder is terminated with a removable insert shaped as a circular tray with a central circular opening, which is provided with an internal skirting directed downwards; said internal skirting has an outer diameter that fits or is less than the internal diameter of said removable metal cylinder;

said circular tray has an external skirting, which is directed upwards; said external skirting is designed in a two-stage form, wherein the lower external skirting stage is provided with multiple openings and the upper external skirting stage serves for a pan's positioning for stewing, frying, or other cooking processes;

a removable insert shaped as a metal disc, which is provided with a central circular opening and with multiple perforations or it is shaped as a metal disc from wire netting with its central opening; said metal disk is positioned on the bottom of said circular tray; said metal disk has some circular wave-wise deformations; the heights of said circular wave-wise deformations fit the height of said lower stage of said external skirting of said removable circular tray; the upper surface of said metal disk is covered with a coating with a high emissivity coefficient in the infrared range of electromagnetic radiation.

13. The cooking box, which functions with an external source of hot air or another hot gaseous medium as claimed in claim 9, wherein the upper section of the removable metal cylinder is terminated with a removable insert shaped as a rectangular tray with a central circular opening, which is provided with an internal skirting directed downwards;

said internal skirting has an outer diameter that fits or is less than the internal diameter of said removable metal cylinder;

said rectangular tray has an external skirting, which is directed upwards;

said external skirting is designed in a two-stage form, wherein the lower external skirting stage is provided with multiple openings and the upper external skirting stage serves for a rectangular pan's positioning for stewing, frying, or other cooking processes;

a removable insert shaped as a metal rectangular sheet which is provided with a central circular opening and with multiple perforations or it is shaped as a rectangular wire netting with its central opening; said metal rectangular sheet is positioned on the bottom of said rectangular tray; said rectangular wire netting has some corrugations; the heights of said corrugations fit the height of said lower stage of said external skirting of said removable rectangular tray; the upper surface of said metal rectangular sheet is covered with a coating with a high emissivity coefficient in the infrared range of electromagnetic radiation.

14. The cooking box, which functions with an external source of hot air or another hot gaseous medium as claimed in claim 9, wherein the outlet port is joined with an external pipe branch.

15. The cooking box, which functions with an external source of hot air or another hot gaseous medium as claimed in claim 9, wherein the displaceable connector pipe is manufactured from nonpermeable fabric that is terminated with two metal connectors for fluid communication with the inlet pipe branch and with the pipe branch of the removable metal cylinder.

16. The cooking box, which functions with an external source of hot air or another hot gaseous medium as claimed in claim 9, wherein said cooking box is provided with an external photovoltaic panel, an electrical battery, and a DC/AC inverter.

* * * * *